United States Patent
Lalancette et al.

(10) Patent No.: US 6,831,228 B2
(45) Date of Patent: Dec. 14, 2004

(54) MOUNTING FORMATION FOR AN ELECTRICAL OUTLET BOX

(75) Inventors: Daniel Lalancette, L'Acadie (CA); Tom Bedkowski, Sutton (CA)

(73) Assignee: Thomas & Betts International, Inc., Wilmington, DE (US)

(*) Notice: Subject to any disclaimer, the term of this patent is extended or adjusted under 35 U.S.C. 154(b) by 0 days.

(21) Appl. No.: 10/205,925

(22) Filed: Jul. 26, 2002

(65) Prior Publication Data

US 2003/0024725 A1 Feb. 6, 2003

Related U.S. Application Data

(60) Provisional application No. 60/309,678, filed on Aug. 2, 2001.

(51) Int. Cl.⁷ .................................................. H01H 9/02
(52) U.S. Cl. ........................... 174/58; 174/50; 174/53; 174/48; 220/3.2; 220/3.8; 248/906
(58) Field of Search ........................... 174/58, 54, 61, 174/63, 50, 48, 53; 220/3.2, 3.3, 3.5, 241, 242, 3.92, 3.94, 3.9, 3.8, 4.02; 24/295, 289, 293, 297; 248/906

(56) References Cited

U.S. PATENT DOCUMENTS

| | | | |
|---|---|---|---|
| 2,757,817 A | | 8/1956 | Egan |
| 3,876,821 A | * | 4/1975 | Pringle ........................ 174/53 |
| 3,955,463 A | * | 5/1976 | Hoehn ......................... 174/53 |
| 4,214,667 A | * | 7/1980 | Lass ............................ 174/53 |
| 4,311,422 A | * | 1/1982 | Jackovitz ..................... 174/53 |
| 4,842,156 A | | 6/1989 | Nattel |
| 4,865,556 A | * | 9/1989 | Campbell et al. ............. 29/622 |
| 4,936,396 A | * | 6/1990 | Lockwood .................... 174/53 |
| 4,983,785 A | * | 1/1991 | Johnston ...................... 174/53 |
| 5,072,848 A | * | 12/1991 | Pipis et al. ................... 174/66 |
| 5,170,013 A | * | 12/1992 | Borsh et al. .................. 174/53 |
| 5,170,014 A | * | 12/1992 | Borsh .......................... 174/53 |
| 5,579,939 A | | 12/1996 | Bourassa |
| 5,594,208 A | * | 1/1997 | Cancellieri et al. ........... 174/58 |
| 5,595,362 A | * | 1/1997 | Rinderer et al. ............. 220/3.9 |
| 5,601,455 A | | 2/1997 | Bagga |
| 5,603,424 A | | 2/1997 | Bordwell et al. |
| 5,703,327 A | | 12/1997 | Jorgensen |
| 5,744,753 A | | 4/1998 | Nattel |
| 5,932,844 A | * | 8/1999 | MacAller et al. ......... 174/65 R |
| 6,107,568 A | * | 8/2000 | Schnell et al. ................ 174/54 |
| 6,410,851 B1 | * | 6/2002 | Lamar et al. ................. 174/66 |
| 6,423,898 B1 | * | 7/2002 | Croker ......................... 174/48 |

* cited by examiner

Primary Examiner—Dean A. Reichard
Assistant Examiner—Angel R. Estrada
(74) Attorney, Agent, or Firm—Hoffman & Baron, LLP

(57) ABSTRACT

A mounting formation for an electrical outlet box includes a dome and a flap. The dome has a base that is formed within an opening. The base is connected to the wall of the electrical outlet box and the flap is connected to the dome within the opening to cover a first portion of the opening while defining a second portion that is uncovered and crescent shaped. The mounting formation facilitates the installation of electrical outlet box, boxes without the need to separately remove a knock-out prior to the installation of fasteners.

34 Claims, 6 Drawing Sheets

MOUNTING FORMATION FOR AN ELECTRICAL OUTLET BOX

BACKGROUND OF THE INVENTION

This application claims priority to U.S. Provisional Application 60/309,678 filed on Aug. 2, 2001, which is incorporated herein by reference.

FIELD OF THE INVENTION

The present invention relates generally to a mounting formation for metal boxes and a method of forming the mounting formation. The present invention is also directed to a method of mounting electrical outlet boxes to a support structure.

BRIEF DESCRIPTION OF THE PRIOR ART

Electrical outlet boxes are well known devices. Illustrative examples showing the general characteristics of electrical outlet boxes are included in the following United States patents:

U.S. Pat. No. 2,757,817 to Egan: Aug. 7, 1956
U.S. Pat. No. 5,703,327 to Jorgensen: Dec. 30, 1997
U.S. Pat. No. 5,603,424 to Bordwell et al.: Feb. 18, 1997
U.S. Pat. No. 5,579,939 to Bourassa: Dec. 3, 1996
U.S. Pat. No. 4,842,156 to Nattel: Jun. 27, 1989
U.S. Pat. No. 5,744,753 to Nattel: Apr. 28, 1998

In new construction, the electrical outlet boxes are typically mounted to wall studs prior to placement of the wall on the studs. Conventional fasteners such as nails and screws can be used in these situations to mount the electrical outlet boxes to the wall studs. Generally the electrical outlet box is configured to accommodate the fasteners at a plurality of locations on at least one side plate to suit the installers needs in the field. Where the electrical outlet box is configured to accommodate fasteners at both side plates, the boxes are usually provided with small holes or larger openings that are fitted with a knock out for at least one of the side plates as required by many national electrical codes. This requirement is generally intended to prevent a rod having a diameter as specified by the electrical codes from being inserted through both side plates. The knock out for this application is generally a substantially circular portion of the wall of the electrical box that is configured to be punched out or bent back in the field by the installer prior to the installation of the fastener. Where holes are provided, the maximum size of the hole is generally limited by national electrical codes which specify the diameter for the rod which cannot be inserted through both walls. In the United States, the Underwriters Laboratories (UL) code currently indicates that the rod diameter is 0.120 inch (3.05 mm). Similarly in Canada, the Canadian Standards Association (CSA) indicates that the rod diameter is 3.0 mm (0.118 inch).

In boxes that are configured to have openings larger than the permissible maximum of about 0.118 inch on both side plates, manufacturers are required to fit the opening with a knockout to ensure compliance with the electrical code. In order to install these boxes in the field, the installers must first punch out the knock out before installing the appropriate fastener. Accordingly, it would be desirable to provide an electrical outlet box having walls configured to accommodate large diameter fasteners without the need to separately remove knock outs prior to the installation of the fasteners.

SUMMARY OF THE INVENTION

In accordance with one form of the present invention, a mounting formation for an electrical outlet box having a side plate includes a dome and a flap. The dome has a base and is formed with an opening defined by an edge. The base is connected to the side plate of the electrical outlet box. The flap is connected to the dome and is defined by a perimeter to cover a first portion of the opening while defining a second portion that is uncovered. Preferably the perimeter of the flap and the edge of the opening define a gap having a width less than about 0.120 inch.

In a preferred embodiment of the invention, the base of the dome is preferably configured to be substantially U-shaped having a curved portion and a substantially straight portion. The dome preferably includes a first arch-shaped portion and a second arch-shaped portion. The first arch-shaped portion includes the straight portion of the base and the second arch-shaped portion is connected between the curved portion of the base and the first arch-shaped portion. Preferably the first arch-shaped portion is substantially flat. Preferably the opening is located within the first arch-shaped portion to either partially extend through the straight portion or be adjacent to the straight portion. The opening is preferably positioned substantially in the middle of the straight portion. Preferably the second arch-shaped portion is configured to support the first arch-shaped portion so that the first arch-shaped portion is at an obtuse angle with respect to the side plate. Preferably the flap has a substantially circular shape and the opening has a substantially elliptical shape. The flap is preferably integrally connected to the edge of the opening. Preferably the second portion of the opening is crescent shaped.

These and other objects, features and advantages of the present invention will become apparent from the following detailed description of illustrative embodiments thereof, which is to be read in connection with the accompanying drawings.

BRIEF DESCRIPTION OF THE DRAWINGS

Preferred embodiments of the invention have been chosen for purposes of illustration and description and are shown in the accompanying drawings, wherein.

DETAILED DESCRIPTION OF THE PREFERRED EMBODIMENTS

Figure 1:
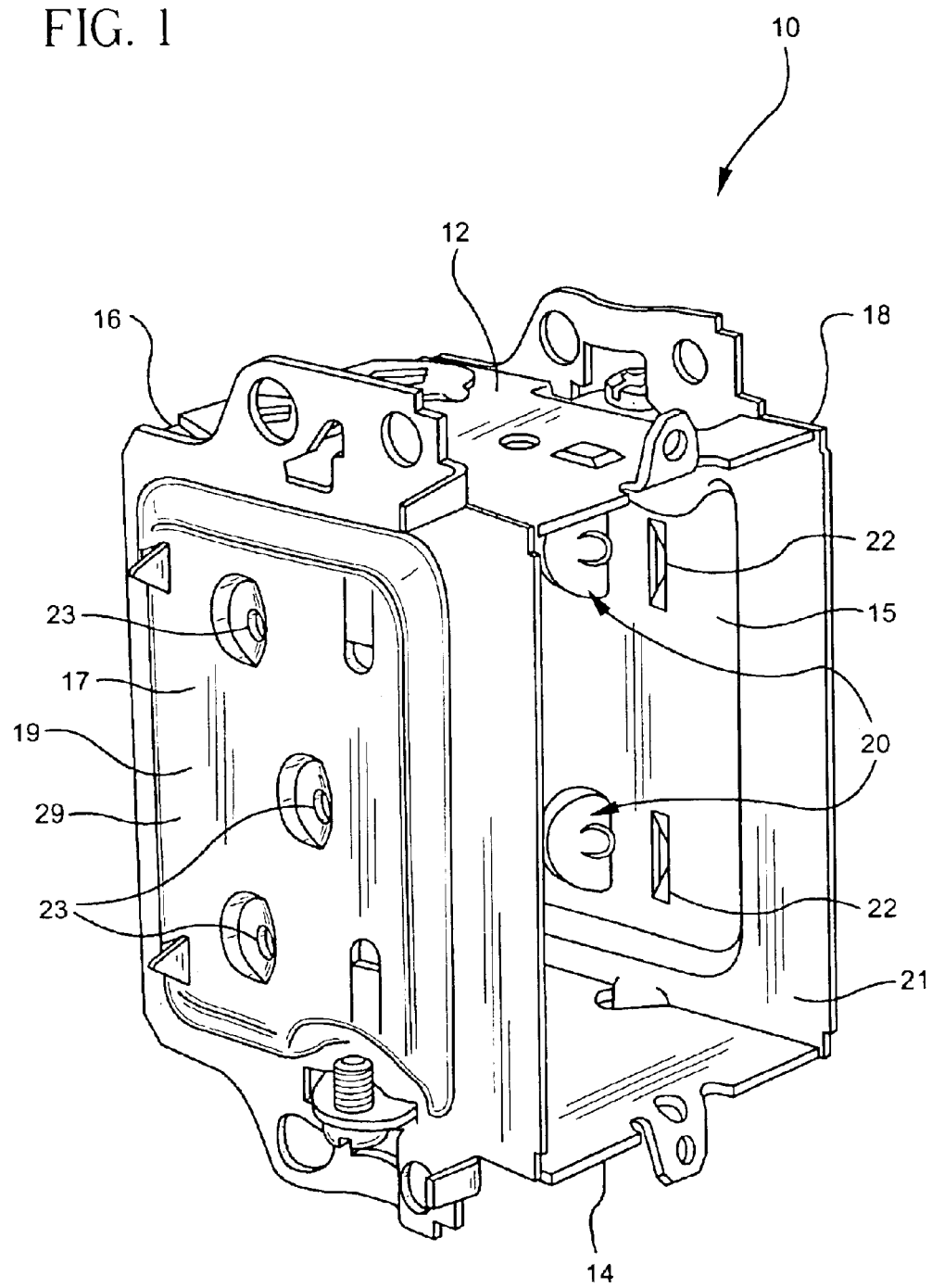
FIG. 1 is a perspective view of an electrical box having a first side plate formed with a pair of mounting formations in accordance with the present invention.

Referring initially to FIG. 1, an electrical outlet box 10 formed in accordance with the present invention is shown. The electrical outlet box 10 generally includes a top wall 12, a bottom wall 14, a back wall 16, a first side wall 18, a second side wall 19 forming a receptacle 21. The electrical outlet box 10 is preferably made of metal, but could also be made of plastic. Preferably the top wall 12, bottom wall 14, and back wall 16 are formed by a U-shaped plate in a similar manner as disclosed in U.S. Pat. No. 5,744,753 to Nattel, which is incorporated herein by reference.

Figure 2:
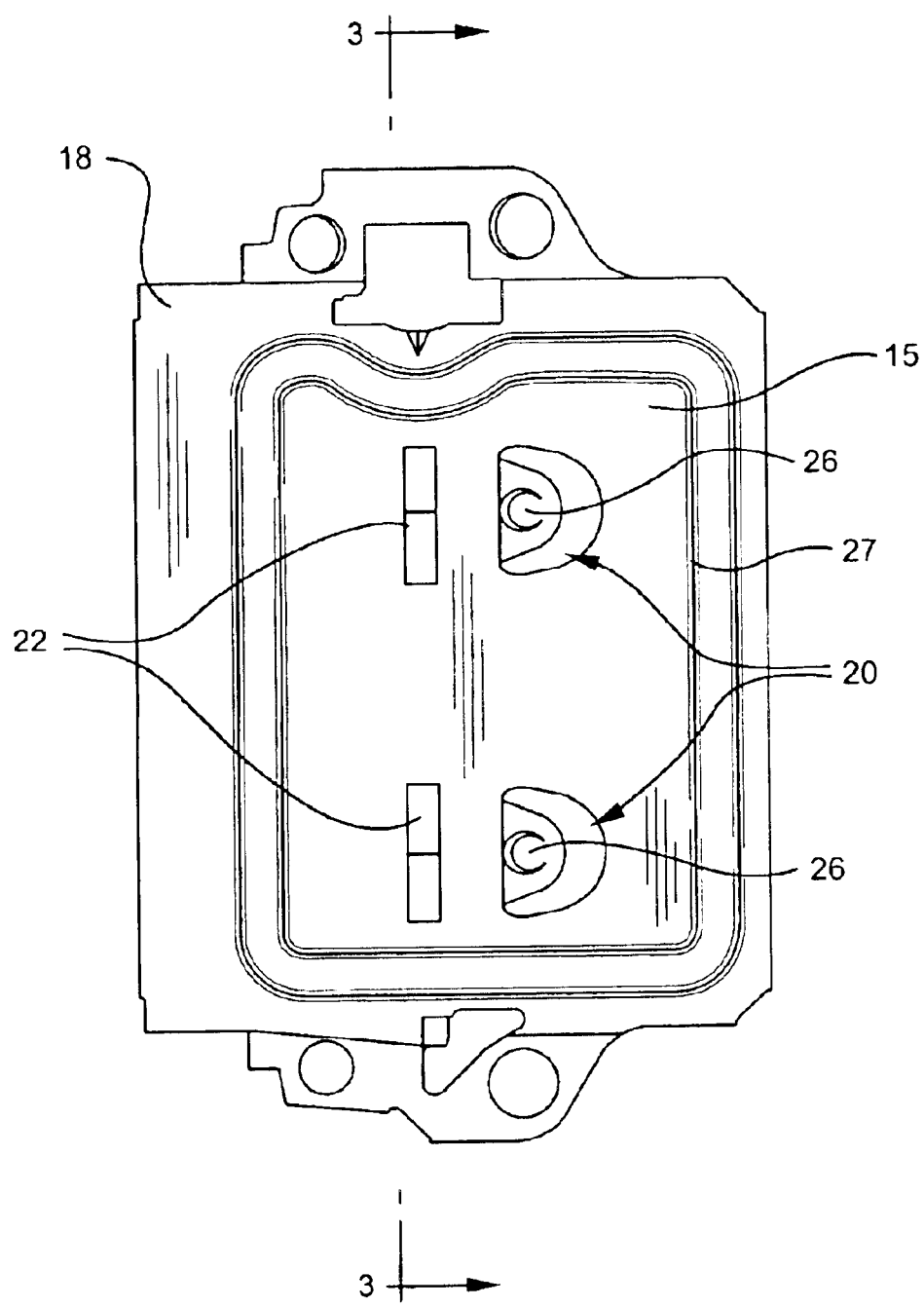
FIG. 2 is an elevational view of the first side wall of the electrical box shown in FIG. 1 showing the pair of mounting formations.
Figure 3:
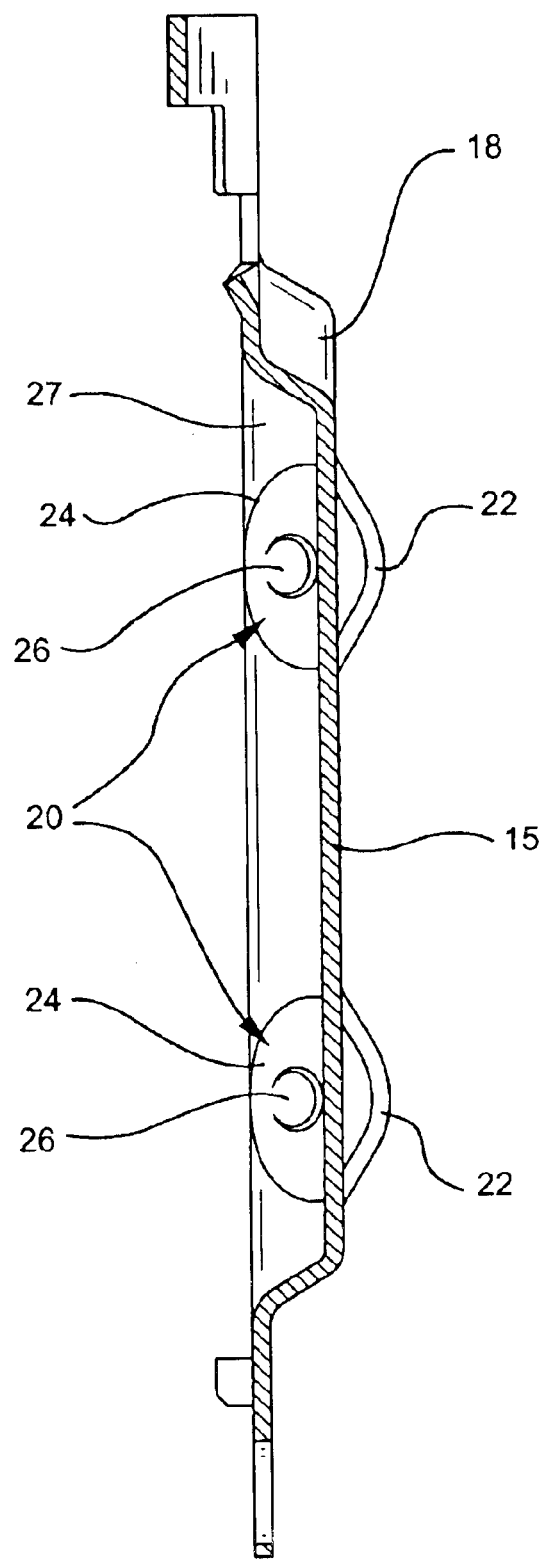
FIG. 3 is a cross-sectional view through the first side wall along line 3—3.
Figure 5:
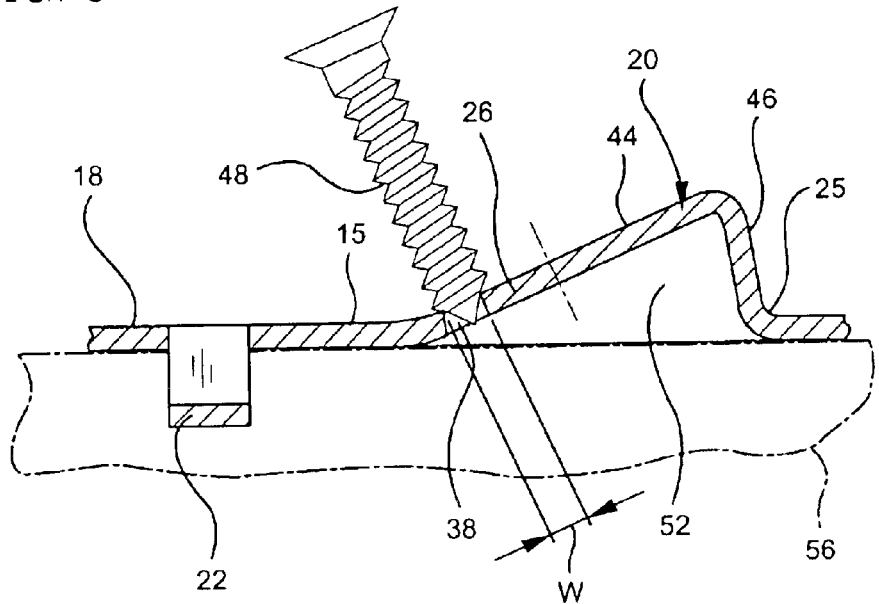
FIG. 5 is a cross sectional view along line 5—5 through the mounting formation having a fastener located at the opening with a support structure shown in phantom.
Figure 6:
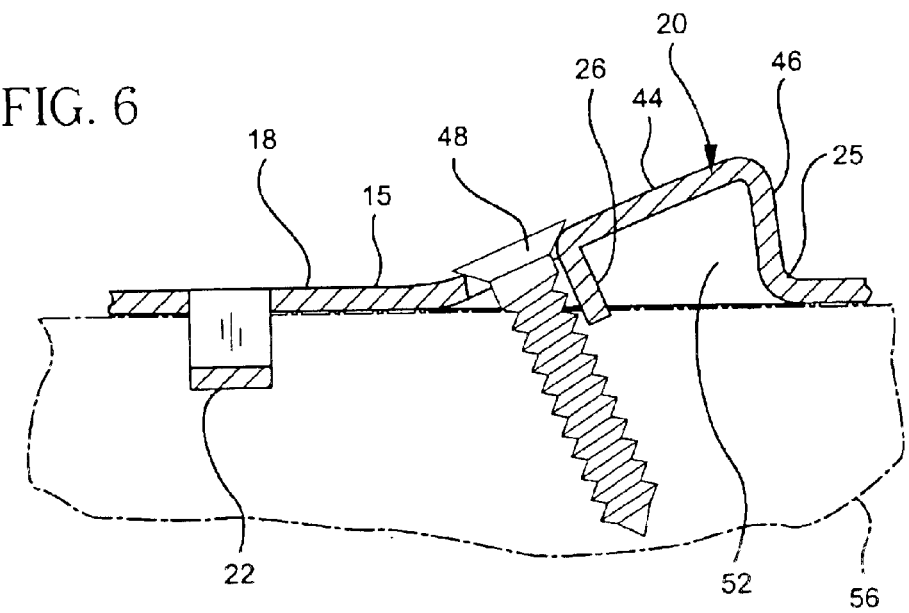
FIG. 6 is a cross sectional view along line 5—5 through the mounting formation having a fastener installed through the opening into the support structure shown in phantom.

Referring now to FIGS. 2 and 3, the first side wall 18 includes a first side plate 15 formed with at least one mounting formation 20 that projects inwardly from the side plate 15. Preferably, the side wall 18 includes two mounting formations 20 positioned at a location suitable for mounting the electrical outlet box 10 to a stud or other component of a wall system as illustrated in FIGS. 5 and 6. Preferably the mounting formations 20 are positioned between the back wall 16 and one or more lancings 22, which are used for positioning the box 10 with respect to a stud or other component of a wall system as shown in FIGS. 1 and 2. As illustrated in FIGS. 2 and 3, preferably the mounting formations 20 are located within a first recessed portion 27 of the side wall 18. Preferably the first side wall 18 is configured to cooperate with the top wall 12, bottom wall 14, and back wall 16 in a similar manner as disclosed in U.S. Pat. No. 5,744,753 to Nattel.

Referring now to FIG. 1, the second side wall 19 includes a second side plate 17 and can be formed with a plurality of mounting holes 23. To accommodate the installation of the electrical outlet box 10, the mounting holes 23 generally have a diameter of at least 0.118 inch. Preferably the mounting holes 23 are formed in a similar manner as the mounting formations 20 described below or as disclosed in U.S. Pat. No. 5,744,753 to Nattel. As illustrated in FIG. 1, preferably the mounting holes 23 are located within a second recessed portion 29 of the side wall 19. Preferably the second side wall 19 is configured to cooperate with the top wall 12, bottom wall 14, and back wall 16 in a similar manner as disclosed in U.S. Pat. No. 5,744,753 to Nattel.

Figure 4:
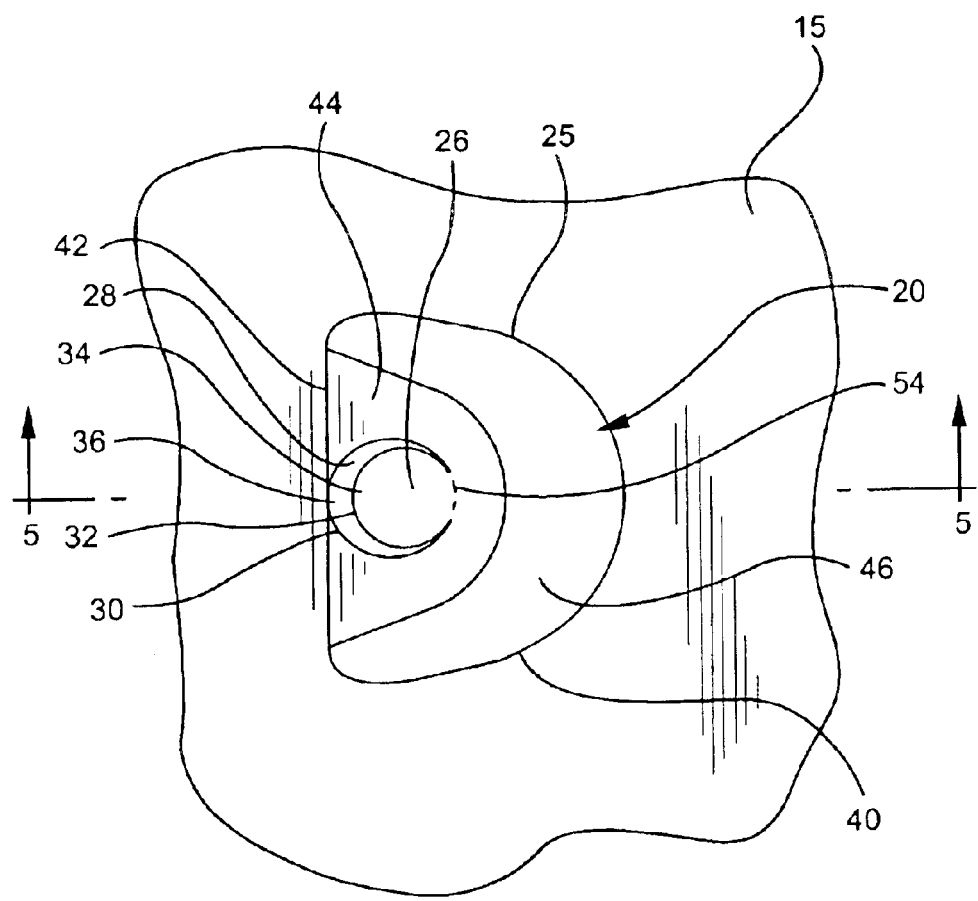
FIG. 4 is an elevational view of the mounting formation.

Referring now to FIG. 4, the mounting formation 20 includes a dome 24 and a flap 26. The dome 24 includes a base 25 and is formed with an opening 28 defined by an edge 30. The base 25 is connected to the side plate 15 of the side wall 18. The flap 26 is defined by a perimeter 32 and is attached to the dome 24 to cover a first portion 34 of the opening 28 while defining a second portion 36 that is uncovered. The perimeter 32 of the flap 26 and the edge 30 of the opening define a gap 38 having a width W as shown in FIG. 5. The mounting configuration 20 is preferably configured so that the width W of the gap 38 does not exceed the maximum hole size as defined by the relevant national electrical code. For example, boxes manufactured for use in the United States will have hole sizes limited to 0.120 inch whereas boxes manufactured for use in Canada will have hole sizes limited to 0.118 inch (3.0 mm). This mounting configuration 20 enables manufactures to accommodate fasteners at both side walls 18, 19 while complying with the relevant national electrical code.

Referring again to FIG. 4, preferably the base 25 of the dome 24 is configured to be substantially U-shaped having a curved portion 40 and a substantially straight portion 42. Most preferably the dome 24 includes first and second arch-shaped portions 44, 46. The first arch-shaped portion 44 is preferably substantially flat and includes the straight portion 42 of the base 25. The second arch-shaped portion 46 is connected between the curved portion 40 of the base 25 and the first arch-shaped portion 44. Preferably the opening 28 is located within the first arch-shaped portion 44 to either partially extend through or be adjacent to the straight portion 42. Most preferably, the opening 28 is positioned substantially in the middle of the straight portion 42. The second arch-shaped portion 46 is preferably configured to support the first arch-shaped portion 44 so that the first arch-shaped portion 44 is at an obtuse angle with respect to the first side plate 15 as shown in FIGS. 5 and 6. This configuration is advantageous in that it makes it easier for installers to insert a fastener 48 through the opening 28 as shown in FIGS. 5 and 6.

Referring now to FIG. 4, the perimeter 32 of the flap 26 is preferably configured so that the flap 26 has a substantially circular shape. The edge 30 of the opening 28 is preferably configured so that the opening 28 has a substantially elliptical shape. Preferably the flap 26 is integrally connected to the first arch shaped portion 44 of the dome 24 with the dashed line 54 shown in FIG. 4 representing an imaginary boundary for illustration purposes only between the edge 30 of the opening 28 and the perimeter 32 of the flap 26. Where the flap 26 is circularly shaped and the opening 28 is elliptically shaped, the second portion 36 of the opening 28 is preferably crescent shaped as shown in FIG. 4. In an alternative embodiment (not shown), the shape of the flap 26, opening 28, and second portion 36 are all substantially rectangular shaped.

Figure 7:
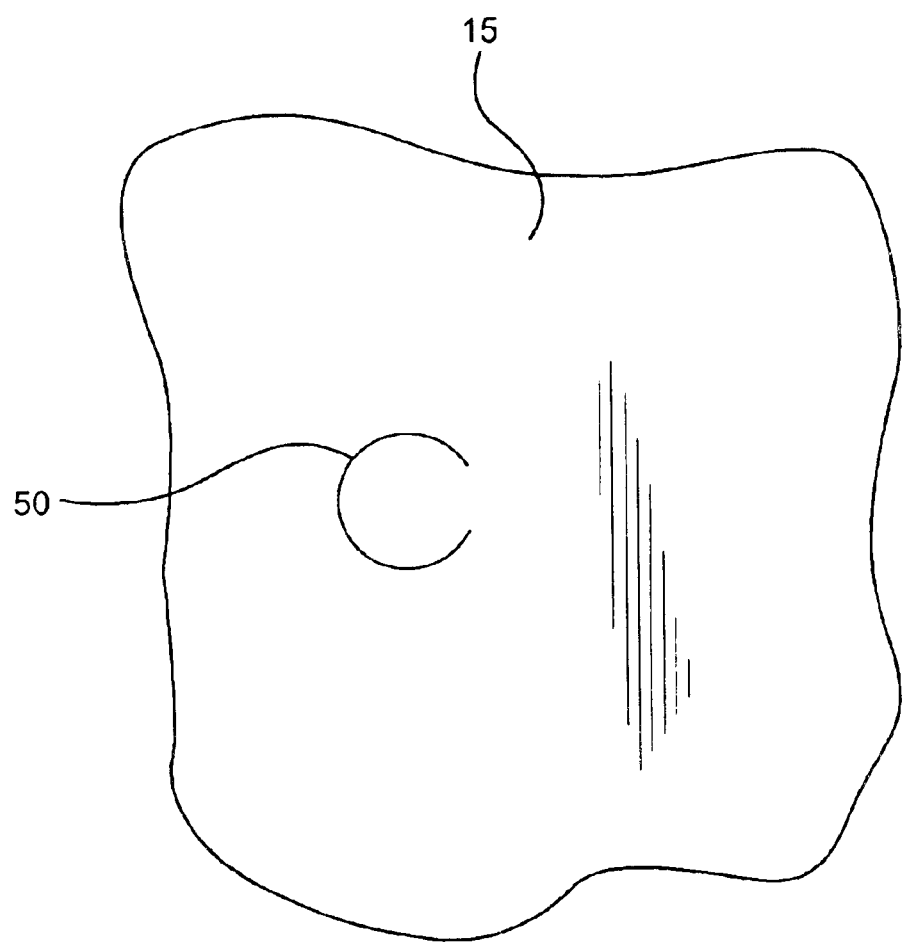
FIG. 7 is an elevational view of the initial cut that is made in forming the mounting formation.

Referring now initially to FIG. 7, the mounting formation 20 is preferably formed by making an initial circular cut 50 through the first side plate 15 corresponding to the perimeter 32 of the flap 26 that is not attached to the side plate 15. After the cut is made, the dome 24 is formed in the side plate 15 which stretches the side plate 15 material in the first arch-shaped portion 44 to simultaneously define the edge 30 of the opening 28. The perimeter 32 of the flap 26 remains substantially the same due to the circular cut 50 during the forming of the opening 50. Preferably the mounting holes 23 are formed in a similar manner as the mounting formations 20 except that the portion that forms a flap 26 of a mounting formation 20 is completely cut out to form a hole prior to forming a dome 24 as noted above. The mounting formation 20 can also be formed by initially forming the dome 24 followed by cutting out the second portion 36 of the opening 28. In an alternative embodiment of the present invention, the invention is formed without the dome 24 by simply cutting out the second portion 36 of the opening 28 in a side plate 15, 17.

Referring now to FIGS. 5 and 6, the installation of the outlet box 10 utilizing the mounting formations 20 generally first includes positioning the end of a fastener 48, such as a screw or a nail, in the gap 38 and then installing the fastener 48 into the supporting structure 56 in the conventional manner. During the installation of a fastener 48 from within the box 10 through the outer side plate 18 as shown in FIG. 3, the flap 26 will normally bend out into the cavity 52 defined by the dome 24 as shown in FIG. 6 and will not interfere with the installation of the box 10. Under certain circumstances, the flap 26 will bend inwardly into the interior of the box 10 due to the installation of the fastener 48. This generally occurs during the installation of screw type fasteners when the flap 26 gets caught on the threads of the screws. In this case, the head of the screw will cover the flap 26. Under both scenarios, the installer can simply install the fastener 48 without having to first remove a knockout. In addition, it is possible that the flap 26 will break off during the installation process.

Although illustrative embodiments of the present invention have been described herein with reference to the accompanying drawings, it is to be understood that the invention is not limited to those precise embodiments, and that various other changes and modifications may be effected by one skilled in the art without departing from the scope or spirit of the invention.

What is claimed is:

1. An electrical outlet box comprising:

a plurality of walls configured to define a receptacle, said plurality of walls including a first side wall and a second side wall, said first side wall including a first side plate having a mounting formation, said mounting formation including:

a dome having a base, a first arch-shaped portion, a second arch-shaped portion and being formed with an opening defined by an edge, said base being connected to said first side plate and being configured to be substantially U-shaped having a curved portion and a substantially straight portion, said first arch-shaped portion including said straight portion of said base, said second arch-shaped portion being connected between said curved portion of said base and said first arch-shaped portion; and a flap connected to said dome and being defined by a perimeter to cover a first portion of said opening while defining a second portion that is uncovered; and said second side wall including a second side plate having at least one hole having a diameter of at least 0.118 inch.

2. An electrical outlet box as defined in claim 1, wherein said first arch-shaped portion is substantially flat.

3. An electrical outlet box as defined in claim 1, wherein said opening is located within said first arch-shaped portion.

4. An electrical outlet box as defined in claim 2, wherein said second arch-shaped portion is configured to support said first arch-shaped portion so that said first arch-shaped portion is at an obtuse angle with respect to said first side plate.

5. A mounting formation for an electrical outlet box having a side plate, said mounting formation comprising:

a dome having a base and being formed with an opening defined by an edge, said base being connected to the side plate, said edge defining a plane; and a flap connected to said dome and being defined by a perimeter to cover a first portion of said opening while defining a second portion that is uncovered, said flap being located substantially in said plane.

6. A mounting formation as defined in claim 5, wherein said flap and said edge of said opening define a gap having a width less than about 0.120 inch.

7. A mounting formation as defined in claim 5, wherein said base of said dome is configured to be substantially U-shaped having a curved portion and a substantially straight portion.

8. A mounting formation as defined in claim 7, wherein said perimeter of said flap is configured so that said flap has a substantially circular shape.

9. A mounting formation as defined in claim 8, wherein said edge of said opening is configured so that said opening has a substantially elliptical shape.

10. A mounting formation as defined in claim 9, wherein said flap is integrally connected to said edge of said opening.

11. A mounting formation as defined in claim 10, wherein said second portion of said opening is crescent shaped.

12. A mounting formation for an electrical outlet box having a side plate, said mounting formation comprising:

a dome having a base, a first arch-shaped portion, a second arch-shaped portion and being formed with an opening defined by an edge, said base being connected to the side plate and being configured to be substantially U-shaped having a curved portion and a substantially straight portion, said first arch-shaped portion including said straight portion of said base, said second arch-shaped portion being connected between said curved portion of said base and said first arch-shaped portion; and a flap connected to said dome and being defined by a perimeter to cover a first portion of said opening while defining a second portion that is uncovered.

13. A mounting formation as defined in claim 12, wherein said first arch-shaped portion is substantially flat.

14. A mounting formation as defined in claim 12, wherein said opening is located within said first arch-shaped portion.

15. A mounting formation as defined in claim 12, wherein said opening is located within said first arch-shaped portion to partially extend through said straight portion.

16. A mounting formation as defined in claim 12, wherein said opening is located within said first arch-shaped portion to be adjacent to said straight portion.

17. A mounting formation as defined in claim 15, wherein said opening is positioned substantially in said middle of said straight portion.

18. A mounting formation as defined in claim 16, wherein said opening is positioned substantially in said middle of said straight portion.

19. A mounting formation as defined in claim 13, wherein said second arch-shaped portion is configured to support said first arch-shaped portion so that said first arch-shaped portion is at an obtuse angle with respect to the side plate.

20. A side wall for an electrical outlet box, said side wall comprising:

a side plate having a mounting formation, said mounting formation including:

a dome having a base and being formed with an opening defined by an edge, said base being connected to said side plate, said edge defining a plane; and a flap connected to said dome and being defined by a perimeter to cover a first portion of said opening while defining a second portion that is uncovered, said flap being located substantially in said plane.

21. A side wall as defined in claim 20, wherein said base of said dome is configured to be substantially U-shaped having a curved portion and a substantially straight portion.

22. A side wall as defined in claim 20, wherein said side plate is formed with a recessed portion and said mounting formation is located within said recessed portion.

23. A side wall for an electrical outlet box, said side wall comprising:

a side plate having a mounting formation, said mounting formation including:

a dome having a base, a first arch-shaped portion, a second arch-shaped portion and being formed with an opening defined by an edge, said base being connected to the side plate and being configured to be substantially U-shaped having a curved portion and a substantially straight portion, said first arch-shaped portion including said straight portion of said base, said second arch-shaped portion being connected between said curved portion of said base and said first arch-shaped portion; and a flap connected to said dome and being defined by a perimeter to cover a first portion of said opening while defining a second portion that is uncovered.

24. A side wall as defined in claim 23, wherein said first arch-shaped portion is substantially flat.

25. A side wall as defined in claim 23, wherein said opening is located within said first arch-shaped portion.

26. A side wall as defined in claim 24, wherein said second arch-shaped portion is configured to support said first arch-shaped portion so that said first arch-shaped portion is at an obtuse angle with respect to said side plate.

27. An electrical outlet box comprising:
a plurality of walls configured to define a receptacle, said plurality of walls including
a first side wall and a second side wall,
said first side wall including a first side plate having a mounting formation, said mounting formation including:
a dome having a base and being formed with an opening defined by an edge, said base being connected to said first side plate, said edge defining a plane; and
a flap connected to said dome and being defined by a perimeter to cover a first portion of said opening while defining a second portion that is uncovered, said flap being located substantially in said plane; and
said second side wall including a second side plate having at least one hole having a diameter of at least 0.118 inch.

28. An electrical outlet box as defined in claim 27, wherein said base of said dome is configured to be substantially U-shaped having a curved portion and a substantially straight portion.

29. An electrical outlet box as defined in claim 27, wherein said first side plate is formed with a recessed portion and said mounting formation is located within said recessed portion.

30. A mounting formation for an electrical outlet box having a side plate, said mounting formation comprising:
a dome having a base and being formed with an opening defined by an edge, said base being connected to the side plate; and
a flap connected to said dome and being defined by a perimeter to cover a first portion of said opening while defining a second portion that is uncovered, said first portion being larger than said second portion.

31. A mounting formation as defined in claim 30, wherein said base of said dome is configured to be substantially U-shaped having a curved portion and a substantially straight portion.

32. A mounting formation as defined in claim 31, wherein:
said perimeter of said flap is configured so that said flap has a substantially circular shape;
said edge of said opening is configured so that said opening has a substantially elliptical shape; and
said second portion of said opening is crescent shaped.

33. A side wall for an electrical outlet box, said side wall comprising:
a side plate formed with a recessed portion and having a mounting formation located within said recessed portion, said mounting formation including:
a dome having a base and being formed with an opening defined by an edge, said base being connected to said side plate; and
a flap connected to said dome and being defined by a perimeter to cover a first portion of said opening while defining a second portion that is uncovered.

34. An electrical outlet box comprising:
a plurality of walls configured to define a receptacle, said plurality of walls including
a first side wall and a second side wall,
said first side wall including a first side plate formed with a recessed portion and having a mounting formation located within said recessed portion, said mounting formation projecting inwardly towards said second side wall and including:
a dome having a base and being formed with an opening defined by an edge, said base being connected to said plate; and
a flap connected to said dome and being defined by a perimeter to cover a first portion of said opening while defining a second portion that is uncovered; and
said second side wall including a second side plate having at least one hole.

* * * * *

UNITED STATES PATENT AND TRADEMARK OFFICE
CERTIFICATE OF CORRECTION

PATENT NO. : 6,831,228 B2
DATED : December 14, 2004
INVENTOR(S) : Lalancette et al.

It is certified that error appears in the above-identified patent and that said Letters Patent is hereby corrected as shown below:

Title page,
Item [74], *Attorney, Agent, or Firm*, now reads "Hoffman & Baron, LLP" should read -- Hoffmann & Baron, LLP --

Column 5,
Lines 45-46, now reads "wherein said flap" should read -- wherein said perimeter of said flap --

Signed and Sealed this

Twelfth Day of April, 2005

JON W. DUDAS
*Director of the United States Patent and Trademark Office*